United States Patent [19]

Nodama et al.

[11] Patent Number: 5,093,729
[45] Date of Patent: Mar. 3, 1992

[54] TERMINAL APPARATUS

[75] Inventors: Takashi Nodama; Junichi Yoshizumi; Kazuhiro Takahashi; Teruyuki Hino; Tadashi Maehara; Keiji Shinbara, all of Nagaokakyo, Japan

[73] Assignee: Mitsubishi Denki Kabushiki Kaisha, Tokyo, Japan

[21] Appl. No.: 514,254

[22] Filed: Apr. 25, 1990

[30] Foreign Application Priority Data

| Apr. 27, 1989 | [JP] | Japan | 1-50308[U] |
| Aug. 5, 1989 | [JP] | Japan | 1-92379[U] |
| Aug. 5, 1989 | [JP] | Japan | 1-92384[U] |
| Aug. 5, 1989 | [JP] | Japan | 1-92385[U] |
| Aug. 24, 1989 | [JP] | Japan | 1-99491[U] |
| Aug. 24, 1989 | [JP] | Japan | 1-99492[U] |
| Aug. 24, 1989 | [JP] | Japan | 1-99493[U] |
| Aug. 24, 1989 | [JP] | Japan | 1-99494[U] |

[51] Int. Cl.⁵ .............................................. H04N 7/18
[52] U.S. Cl. .................................................. 358/254
[58] Field of Search ................ 358/254, 255, 245, 244

[56] References Cited

U.S. PATENT DOCUMENTS

| 3,665,377 | 5/1972 | MacKenzie, Jr. | 339/198 G |
| 4,635,110 | 1/1987 | Weinblatt | 358/254 |
| 4,766,521 | 8/1988 | Pelletier | 361/426 |

FOREIGN PATENT DOCUMENTS

| 0104512 | 4/1984 | European Pat. Off. |
| 1440153 | 6/1976 | United Kingdom |
| 1495603 | 12/1977 | United Kingdom |

*Primary Examiner*—Edward L. Coles, Sr.
*Assistant Examiner*—Jerome Grant, II

[57] ABSTRACT

A terminal apparatus for a television receiver includes a support shaft disposed in the vicinity of an upper surface of a television receiver cabinet, a terminal box pivotally supported by the supporting shaft, and a plurality of terminals mounted on the terminal box for connecting the television receiver to external devices. The terminal box pivots between two positions so that the terminals are directed toward the back side of the cabinet and the upper side of the cabinet for concealing and connecting cables to the terminals, respectively.

7 Claims, 8 Drawing Sheets

TERMINAL APPARATUS

FIELD OF THE INVENTION

The present invention relates to a terminal apparatus for connecting a television receiver and the like to external devices.

BACKGROUND OF THE INVENTION

FIG. 4 is a perspective view showing a conventional television receiver comprising a terminal apparatus for connecting a television receiver to external devices. In FIG. 4, reference numeral 1 designates a cabinet for housing a television set and reference numeral 2 designates a plurality of terminals for connection to external devices, provided on the back side of the cabinet 1.

As video equipment, such as video tape recorders, have increased recently, the number of external devices to be connected to a television receiver has increased. Therefore, in order to input or output a video/audio signal by connecting the television receiver to various external devices, a plurality of terminals 2 are provided. The terminals 2 are mostly provided on the back side of the cabinet 1 in the prior art as shown in FIG. 4.

Since the television receiver is usually put along a wall surface, it is necessary to move the television receiver to make space for an operator to walk between the television receiver and the wall surface to connect or disconnect the television receiver to or from a external device.

However, since the size of television sets have increased recently, and some weigh 90 kg, it is difficult to move them.

SUMMARY OF THE INVENTION

The present invention was made to solve the abovedescribed problems and it is an object of the present invention to provide a terminal apparatus in which connecting or disconnecting the television receiver and the external devices can be performed without moving the television receiver.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

A terminal apparatus in accordance with the present invention comprises a supporting shaft provided in the vicinity of an upper surface of a cabinet of a television receiver, a terminal box pivotally supported by the supporting shaft, and a plurality of terminals mounted on the terminal box for connecting the television receiver to external devices.

According to the present invention, the terminals of the terminal apparatus are directed to the back side of the cabinet in a normal state and when they are being connected to the external devices, the terminal box on which the terminals are mounted is pivoted and raised toward the upper side of the cabinet. As a result, the terminals are directed upward at the upper side of the cabinet, whereby connections between the terminals and external devices can be easily performed from the front of the cabinet.

BRIEF DESCRIPTION OF THE DRAWINGS

FIGS. 1 to 3 show an embodiment of the present invention in which:

FIG. 1 is a perspective view showing a terminal box in a normal state;

FIG. 2 is a perspective view showing the terminal box in its pivoted state; and

FIG. 3 is a sectional view taken along a line (III)—(III) in FIG. 2;

DETAILED DESCRIPTION OF PREFERRED EMBODIMENTS

An embodiment of the present invention will be described in detail hereinafter in reference to drawings.

Figure 1:
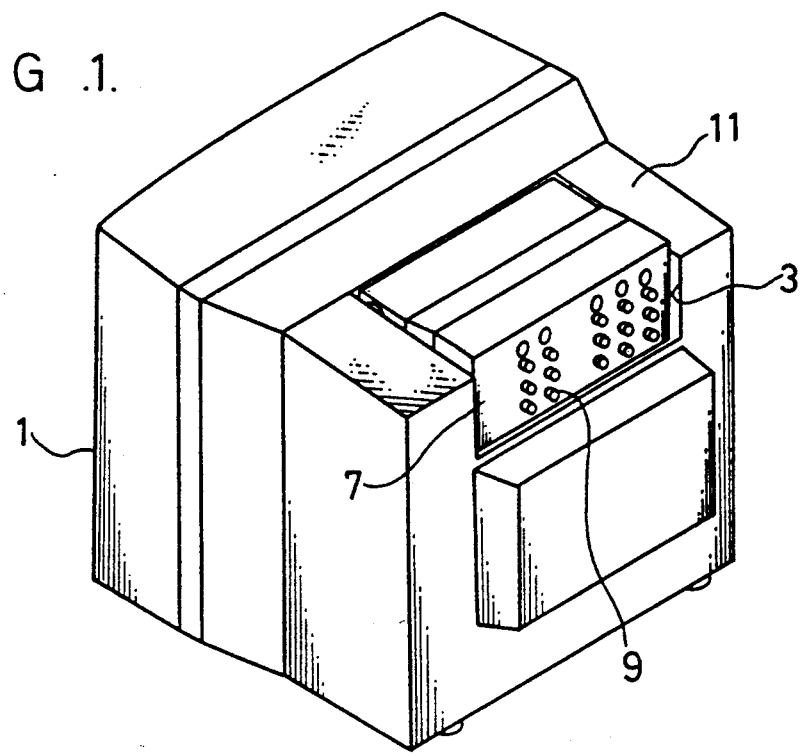
Figure 2:
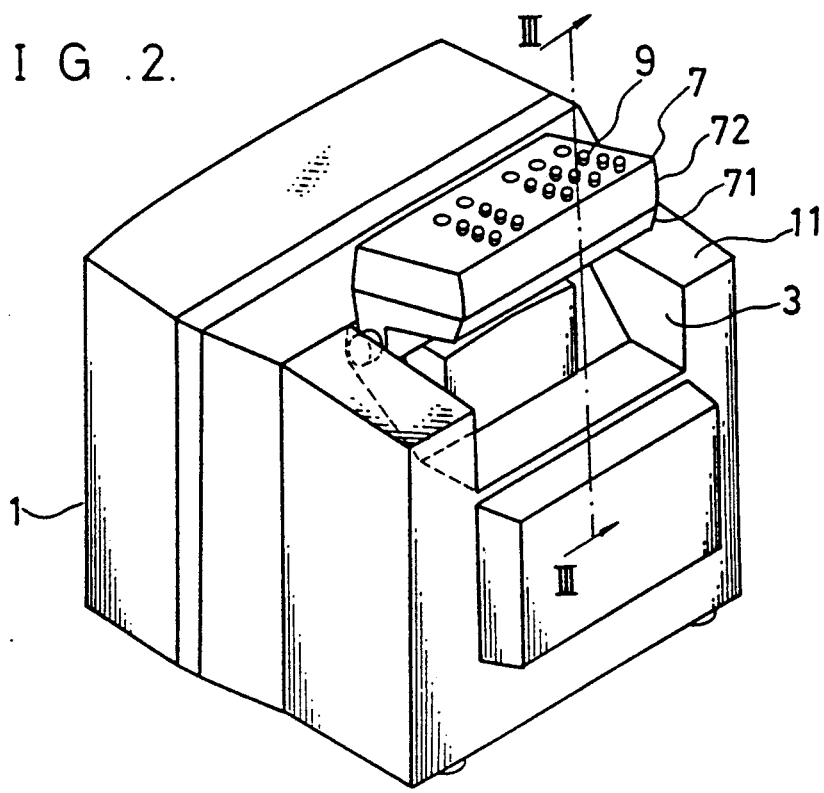
Figure 3:
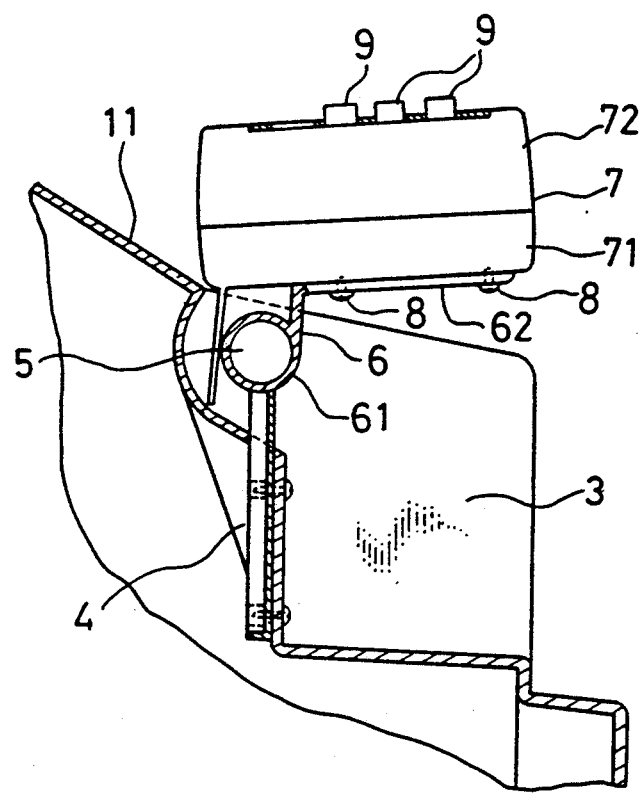
Figure 4:
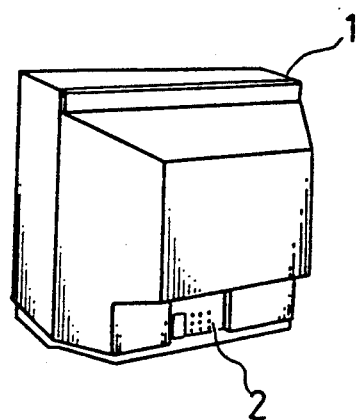
FIG. 4 is a perspective view showing a conventional television receiver comprising a terminal apparatus.

FIG. 1 is a perspective view showing a terminal box in a normal state. FIG. 2 is a perspective view showing the terminal box which is pivoted for connection to external devices. FIG. 3 is a sectional view taken along a line (III)—(III) in FIG. 2. In FIGS. 1 to 3, reference numeral 1 designates a cabinet for housing a television set (not shown), in which the front is on the left and the back is on the right in the figures. Reference numeral 3 designates a terminal box housing part disposed on the upper back side of the cabinet and reference numeral 4 designates a supporting body fixed to the cabinet almost at the center of the front of the terminal box housing part 3 which is in the form of a plate having an appropriate length in a direction perpendicular to the paper surface of FIG. 3 and an upper end positioned in the vicinity of an upper surface 11 of the cabinet. Reference numeral 5 designates a supporting shaft provided along an upper end face of the supporting body 4 and supported by the supporting body 4. Reference numeral 6 designates a mounting member comprising a fitted part 61 pivotally fitted in the supporting shaft 5 and a plate-shaped mounting part 62 extending from the fitted part 61. Reference numeral 7 designates a terminal box comprising a case 71 mounted on the mounting part 62 with a screw 8 and a cover 72 mounted on the case 71. Reference numeral 9 designates terminals provided on a printed wiring board (not shown) mounted in the terminal box and which protrude upwards from the cover 72 to the outside so that cables may be connected thereto without removing the cover 72.

According to the structure in accordance with the present invention, the terminal box 7 is housed in the terminal box housing part 3 in a normal state as shown in FIG. 1 in which the terminal 9 is directed toward the back side of the cabinet 1. When the television set is to be connected to external devices, an operator pulls the terminal box 7 out from the front of the television receiver. Then, the terminal box 7 pivots counterclockwise around the supporting shaft 5 as shown in FIG. 3. This state is shown in FIGS. 2 and 3. In this state, since the terminals 9 are directed upward at the upper side of the cabinet 1, the operator can touch the terminals 9 from the front of the television receiver and easily connect the terminals 9 to a cable connected to an external device. When connecting operation is finished, the terminal box 7 is pushed toward the back side of the cabinet 1, whereby the terminal box 7 pivots clockwise from the state shown in FIGS. 2 and 3 and returns to the state shown in FIG. 1. In this state, the connection cable cannot be seen from the front of the cabinet so that external appearance of the television is not damaged.

Although the terminal apparatus is provided at the upper back of the cabinet in the above embodiment, the same effect can be obtained even when it is provided on the side of the cabinet.

Figure 5:
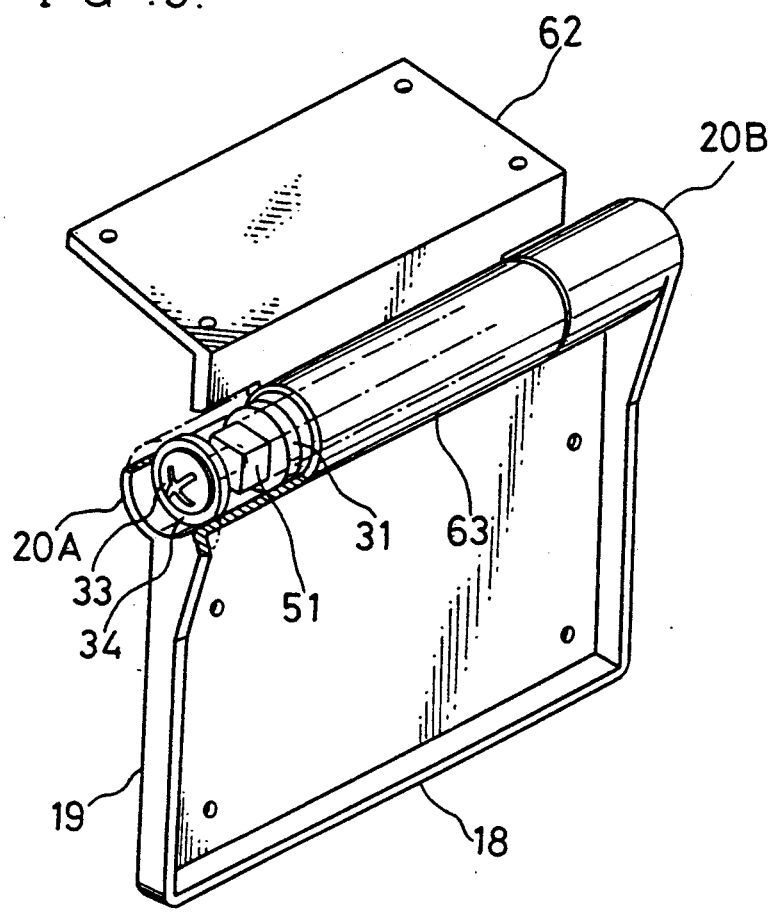
FIG. 5 is a perspective view showing a supporting shaft comprising an elastic member to prevent free pivoting caused by the load of a terminal box in a terminal apparatus in accordance with the present invention.
Figure 6:
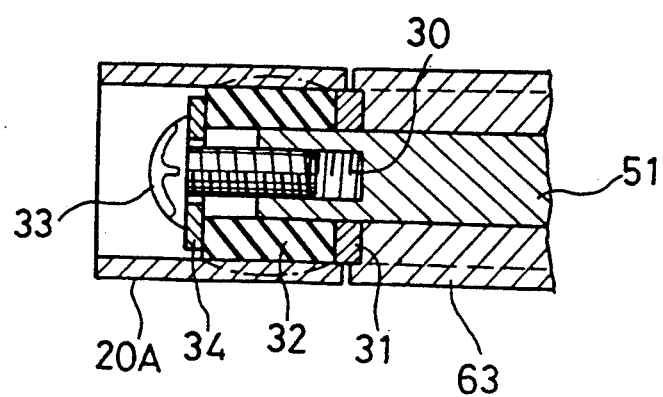
FIG. 6 is a sectional view showing a fixed structure of an elastic bushins shown in FIG. 5.

FIG. 5 is a perspective view showing the supporting shaft and FIG. 6 is a sectional view showing a structure of an elastic bushing mounted on the supporting shaft in the terminal apparatus of an electrical equipment in accordance with the present invention. This elastic bushing is pressed to a fixed part, whereby free pivoting of the terminal box under its own weight is prevented.

In FIGS. 5 and 6, reference numeral 51 designates a supporting shaft having a square cross-section and longer than an cylindrical part 63 of the mounting part 62. Both ends of the supporting shaft 51 extend into cylindrical parts 20A and 20B of supporting body 18 as shown in the figures. A screw hole 30 is formed in each end surface of both ends of the supporting shaft 51. Reference numeral 31 designates a ring-shaped stopper inserted into the supporting shaft 51 from an open end of the cylindrical part 20A and abutting on the end of the cylindrical part 63. Reference numeral 32 designates a cylindrical elastic bushing formed of urethane rubber which is longer than a projecting part of the supporting shaft 51 in the cylindrical part 20A. Therefore, when it is inserted to the end part of the supporting shaft 51, the elastic bushing 32 projects from the supporting shaft 51. Reference numeral 33 designates a screw screwed into the screw hole 30 in the supporting shaft 51 through a washer 34 abutting the end surface of the elastic bushing 32.

As described above, when the screw 33 is fastened with the elastic bush 32 projecting from the end of the supporting shaft 51, the elastic bushing 32 is compressed in the longitudinal direction of the supporting shaft 51. Accordingly, its outer surface swells out like a barrel as shown by a dotted line in FIG. 6. However, this swelling is suppressed by the cylindrical part 20A and the elastic bushing 32 is in a compressed state against the inner surface of the cylindrical part 20A, that is, toward the supporting member base 19. Thus, the supporting shaft 51 is always braked. When the terminal box is rotated in this state, it pivots slowly because of heavy friction. As a result, the terminal box does not abruptly pivot under its own weight and the operator will not pinch a finger therein.

In addition, since the supporting shaft 51 is in the form of square shaft, racing between the supporting shaft and the elastic bushing can be prevented.

Furthermore, a locking device for locking the terminal box 7 may be provided in order to improve operability when the terminals 9 are directed upward at the upper side of the cabinet 1.

Figure 7:
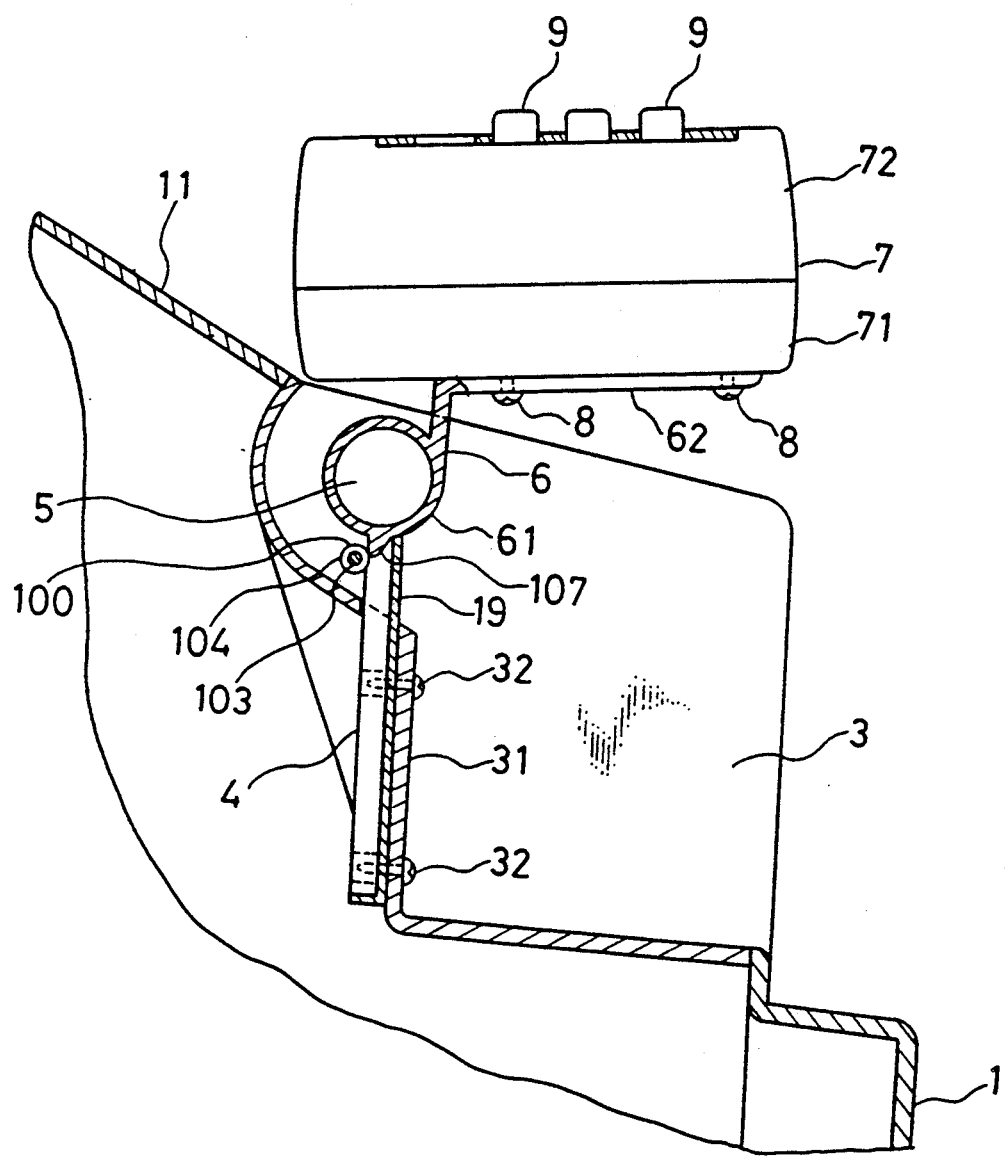
FIG. 7 is a sectional view showing a locking device for locking the terminal box in a specific direction in a terminal apparatus in accordance with the present invention.
Figure 8:
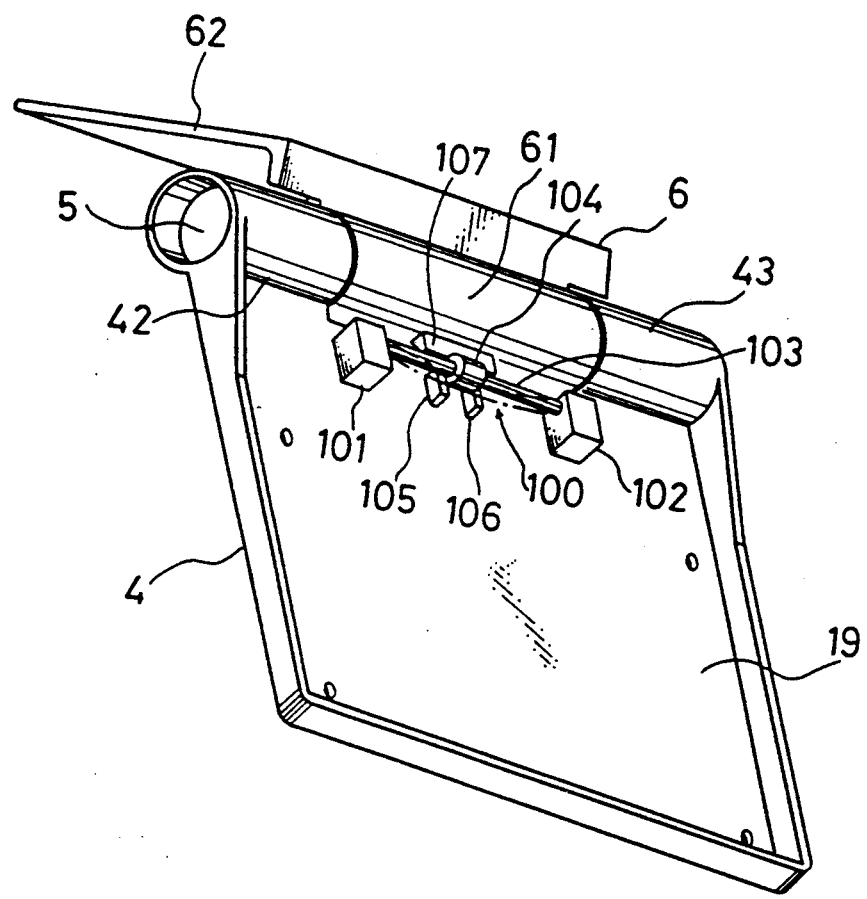
FIG. 8 is a perspective view of the terminal apparatus shown in FIG. 7.

According to FIGS. 7 and 8, reference numeral 100 designates a locking device for locking the terminal box, comprising a pair of projections 101 and 102 separately disposed at an upper end of the supporting member base 19 in the vicinity of the fitted part 61 of the mounting member, a resilient supporting bar 103 having both ends supported by the projections 101 and 102, a roller 104 rotatably fitted in the supporting bar 103 almost at the center thereof, a pair of stops 105 and 106 provided on the supporting member base 19 to control the position of the roller so that the roller may not move in the longitudinal direction of the supporting bar 103, and a protrusion 107 disposed at the fitted part 61 of the mounting member corresponding to the roller.

The protrusion 107 is slightly longer than the shortest distance between the fitted part 61. The roller 104 and the protrusion 107 is disposed between the roller 104 and the supporting member base 19 when the terminals 9 are directed upward at the upper side of the cabinet after the terminal box 7 has been pivoted. When the terminal box 7 is pushed downward and even if the rotation force acts thereon, the protrusion 107 does not pivot because it abuts on the roller 104. Thus, the terminal box 7 is in a locked state. As a result, the operator can easily and reliably perform a cable connecting operation.

When the terminal box 7 is pushed with a little stronger force, the supporting bar 103 of the roller 104 is deflected and bowed downward as shown in FIG. 8 and the protrusion 107 moves over the roller 104 from the state shown in FIG. 7. At this time, the supporting bar 103 can freely pivot around the supporting shaft 5 which is usually housed in the terminal box housing part 3 as shown in FIG. 1.

Although the locking device comprises the protrusion and the roller in the above embodiment, the structure is not so limited and any locking device can be used if it can lock the terminal box when the terminals are directed upward at the upper side of the cabinet.

Figure 9:
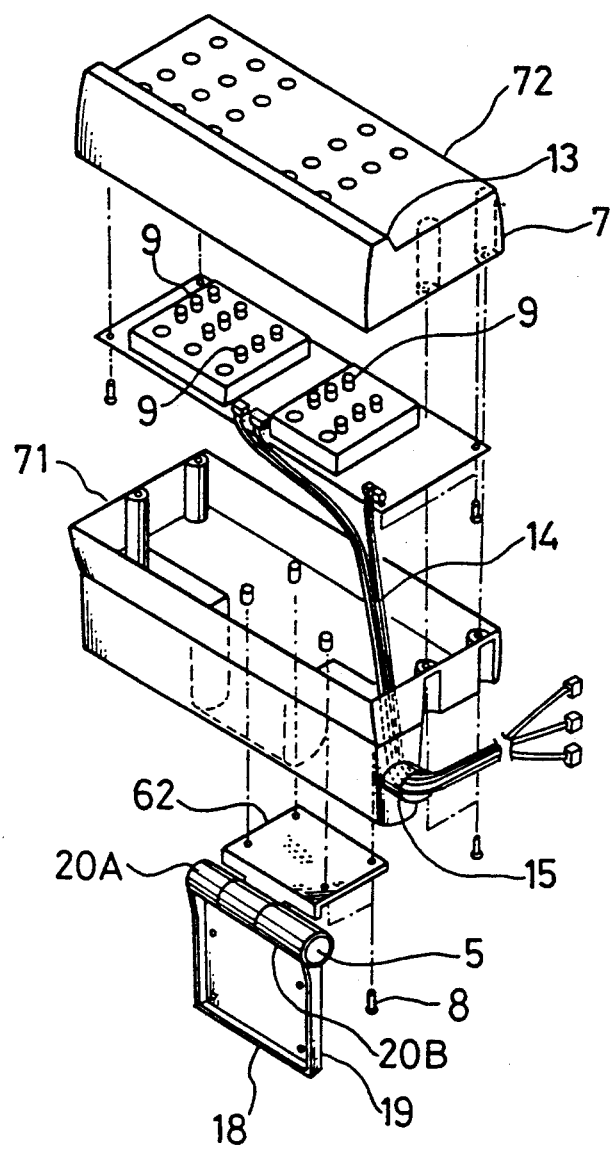
FIG. 9 is an exploded view showing the position of lead wires for connecting the terminal apparatus in accordance with the present invention to a television receiver.

FIG. 9 is a view showing the positions of lead wires connecting the terminals in the terminal apparatus of the electrical equipment in accordance with the present invention to the television receiver. The outlet part 15 of the lead wire 14 is disposed in the vicinity of the supporting shaft 5. Therefore, when the terminal box 7 pivots, only a slight torque is applied to the lead wire 14 and tensile forces, shear forces, bending forces, and the like do not act thereon. As a result, the stress applied to the lead wire 14 can be minimized wherein breakage of the lead wire can be prevented.

Reference numeral 13 designates a projection provided at the upper end of the terminal box 7 in the terminal apparatus of the electrical equipment in accordance with the present invention. As shown in FIG. 9, the terminal box 7 comprises a case 71 fixed to the mounting part 62 by screws 8 and a cover 72 mounted on the case 71. The projection 13 is provided at the upper end of the cover 72 and when the projection 13 is touched by a finger, the terminal box 7 can easily pivot.

Figure 10:
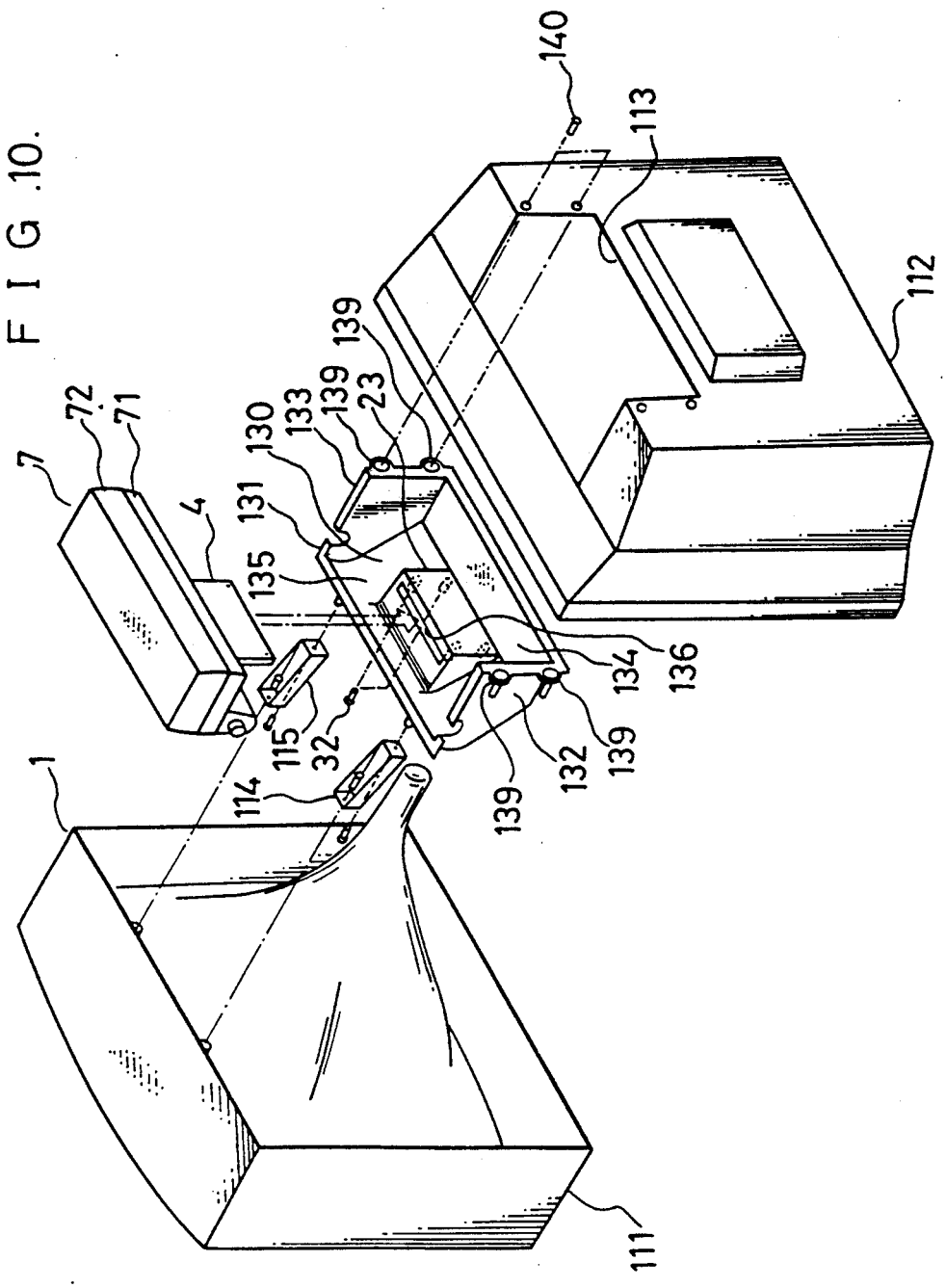
FIG. 10 is an exploded view showing a guiding path for guiding a foreign object when it falls in a terminal apparatus in accordance with the present invention.

FIG. 10 is a view showing a structure of the terminal box, the supporting shaft, and a body in the terminal apparatus according to an electrical equipment of the present invention. The cabinet 1 comprises a front cabinet 111 and the back cabinet 112. Reference numeral 113 designates an opening at an upper part of the back cabinet 112. The terminal box housing part 3 includes the opening 113 and a body of the terminal apparatus to be described later. The body of the terminal apparatus comprises opposed side walls 132 and 133, a bottom part 134 connected to both side walls and a front wall 135 disposed at the front and connected to the bottom part 134. Reference numeral 4 designates a plate-shaped supporting body which is inserted into a hole 136 disposed almost at the center of the front wall 135 and mounted to the fixed part 23 with a screw 32. The terminal box 7 and the body 131 are integrally mounted through the mounting member 6.

When the thus constituted terminal apparatus is mounted on the cabinet 1, first, mounting seats 114 and 115 are mounted on the back side of the front cabinet 111 with screws and then the front wall 135 of the body 131 is mounted on the mounting seats 114 and 115 with screws. Thereafter, the back cabinet 112 is put on the front cabinet 111 in such a manner that the opening 113 corresponds to the position of the body 131. Then, the mounting parts 139 formed on both side walls of the body 131 are mounted on the back cabinet 112 with a screw 140.

At this time, the side walls 132 and 133 of the body abut the peripheries of the opening 113, whereby the terminal box housing part 3 is formed. In this case, since the terminal apparatus is integrally constructed as described above, it can be mounted at one time.

Figure 11:
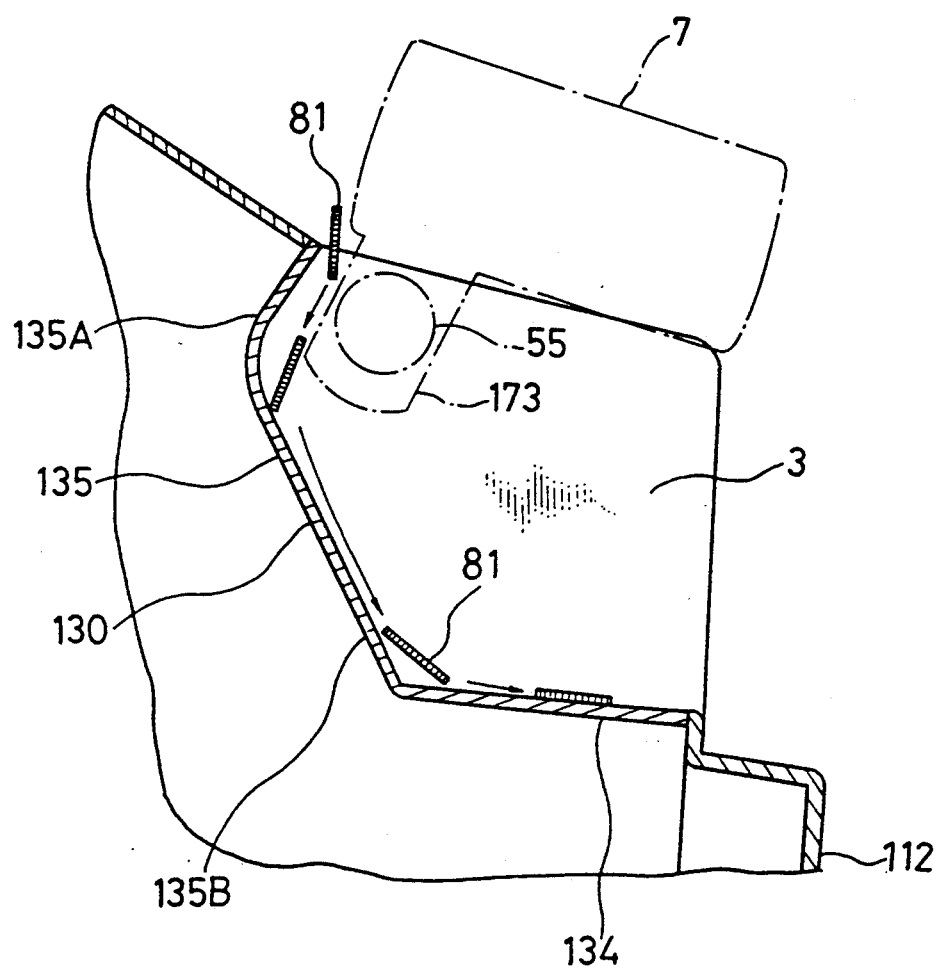
FIG. 11 is a sectional view of the apparatus shown in FIG. 10.

According to the terminal apparatus of the electrical equipment in accordance with the present invention in FIG. 10, a guiding path for downward guiding a foreign object such as a coin, is formed at the front wall of the body. As shown in FIG. 11, an upper part 135A of the front wall 135 of the body 131 is largely curved toward the front cabinet 111 concentrically with the supporting shaft 5, providing a space through which a foreign object, such as a coin or pencil, can be easily passed. A lower part 135B of the front wall 135 is an oblique sliding surface connecting the upper part 135A to the bottom part 134.

As shown in FIG. 11, when the terminal box 7 is pivoted, if a foreign object 81, such as a coin, from a pocket or the like in the vicinity of the terminal box 7 falls, that coin 81 passes through the space between the terminal box 7 and the body 131. Then, the coin 81 falls along the guiding path 130 (shown in FIG. 10) formed at the front wall 135 as shown by an arrow and reaches the bottom part 134 of the body 131.

Although this function is limited to a case where the foreign object 81 is small, its practical effect is remarkable.

In addition, although a television set is used as the terminal apparatus in the above description, the same effect can be obtained even when a projection television or video is used.

Furthermore, the above-illustrated embodiments may be arbitrarily combined.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A terminal apparatus for a television receiver comprising:
   a cabinet having a front side, a back side and a second side generally perpendicular to and extending between the front side and the back side;
   a recessed housing formed at an upper rear portion of said cabinet and open to both the back side and the second side of said cabinet;
   a supporting shaft mounted within said recessed housing;
   a terminal box pivotally supported by said supporting shaft between an access position withdrawn from said recessed housing and a storage position within said recessed housing; and
   a plurality of terminals mounted on said terminal box for connecting a television receiver housed in said cabinet to external devices, said terminal box pivoting through an angle on said supporting shaft between said storage position where said terminals are directed toward the back side of said cabinet and said access position where said terminals are directed toward the second side of said cabinet.

2. A terminal apparatus in accordance with claim 1 including an elastic bushing mounted on said supporting shaft for preventing the weight of said terminal box from pivoting said terminal box on said shaft.

3. A terminal apparatus in accordance with claim 1 comprising a locking device for locking said terminal box in position with said terminals directed toward the second side of said cabinet.

4. A terminal apparatus in accordance with claim 1 including an outlet for lead wires connecting said terminals to the television receiver wherein said outlet is disposed in the vicinity of said supporting shaft.

5. A terminal apparatus in accordance with claim 1 wherein said terminal box includes an upper surface from which said terminals project and a projection projecting toward said terminals from the upper surface of said terminal box.

6. A terminal apparatus in accordance with claim 1 wherein said terminal box includes a housing and said supporting shaft and said terminal box housing are unitary.

7. A terminal apparatus in accordance with claim 1 wherein said terminal box includes a front wall and said supporting shaft is supported at the front wall of said terminal box so that a guiding path for guiding a foreign object is formed between said cabinet and said front wall.

* * * * *